INVENTOR:
NILS BERTIL FREDRIK HOLLANDER,

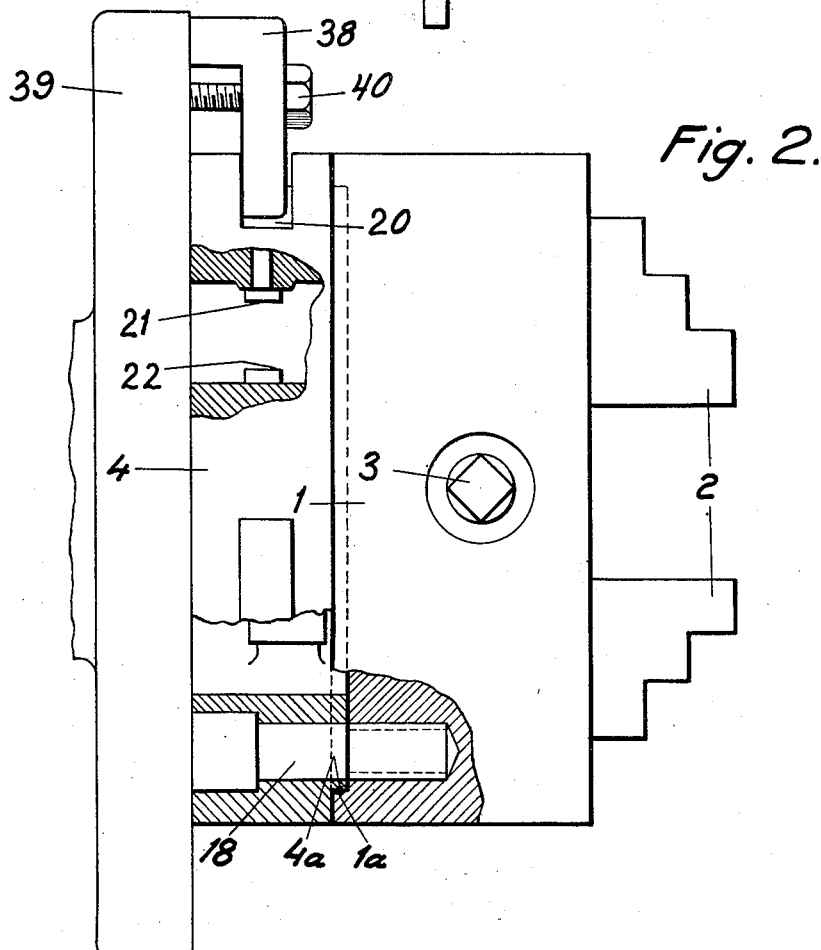

BY Richardson, David and Nordon
ATTORNEYS

July 25, 1950   N. B. F. HOLLANDER   2,516,573
WORK HOLDER
Filed Aug. 3, 1945   4 Sheets-Sheet 4
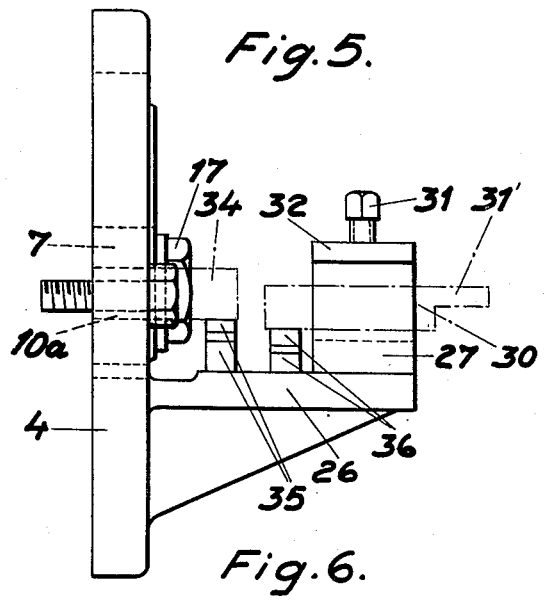
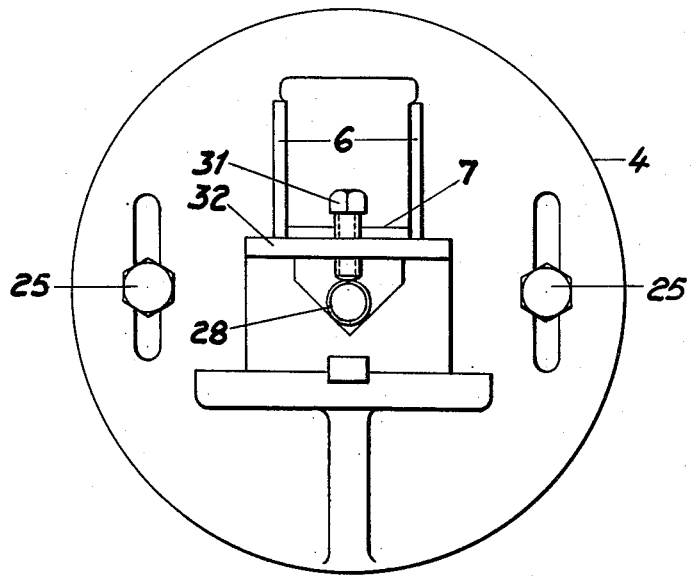
Nils Bertil Fredrik Hollander
INVENTOR Patented July 25, 1950

2,516,573

UNITED STATES PATENT OFFICE 2,516,573

WORK HOLDER

Nils Bertil Fredrik Hollander, St. Essingen, Sweden, assignor to Aktiebolaget V. Löwener, Stockholm, Sweden, a joint-stock company of Sweden Application August 3, 1945, Serial No. 608,760

3 Claims. (Cl. 279—6)

The treatment in lathes and grinding machines of work pieces like an eccentric axle journal requires an eccentric fixing of the work piece relatively to the normal axis of rotation.

The eccentric chucks now to be had on the market are according to the statement of many workshop men not adapted for exact work. The eccentricity of these chucks is adjusted by revolving scales, which obviously cannot be used in turning with a tolerance of some hundredths of millimetres as regards the eccentricity. Moreover, these chucks are very expensive. The present invention relates to such a device, and the invention is on the accompanying drawing shown as applied in a lathe chuck as well as in a grinding fixture.

Figure 2A:
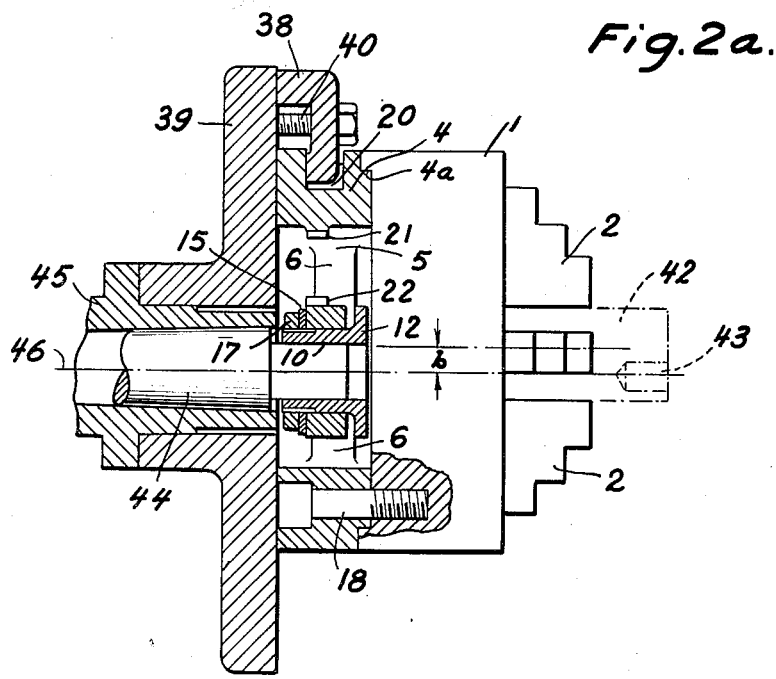
Figure 2B:
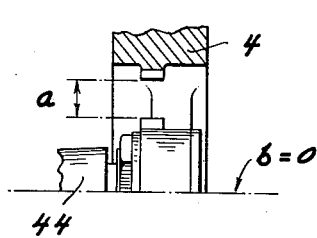
Figure 2C:
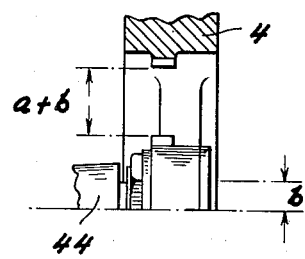
Figure 2D:
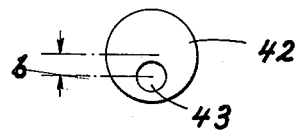
Figure 3:
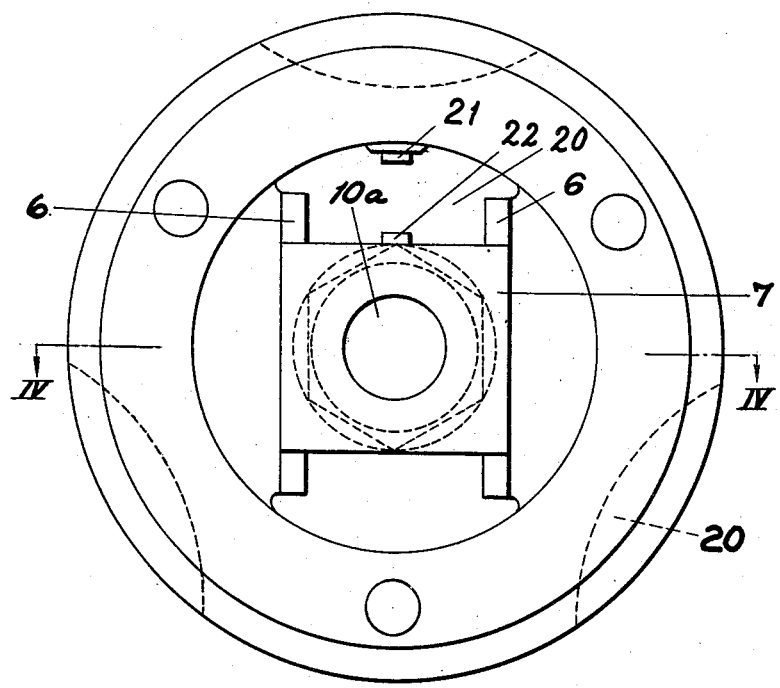
Figure 4:
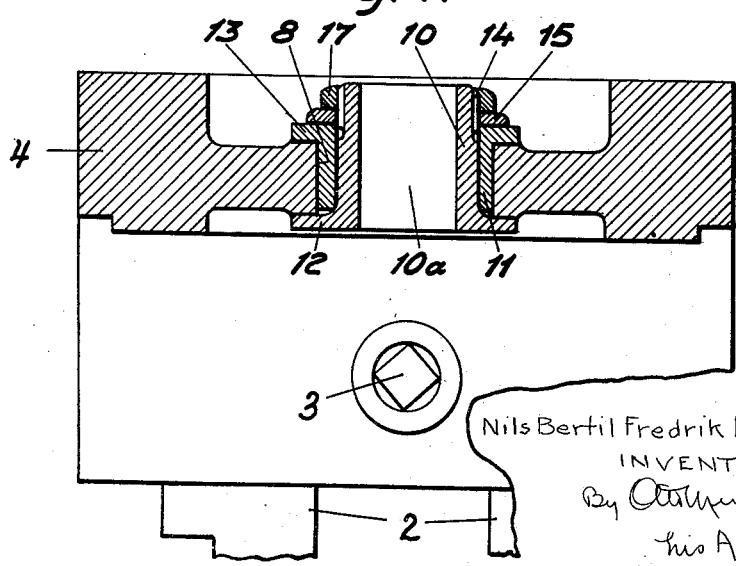

Fig. 1 shows an eccentric axle journal, in the production of which the present invention becomes valuable. Fig. 2 shows the chuck from the side partly in section, Fig. 2a shows a vertical sectional view of a chuck, disk, and spindle disk in locked position, Fig. 2b and Fig. 2c show in vertical cross section different positions of the disk in relation to the center of the spindle disk, Fig. 2d is an end view of the pin to be fixed in the chuck, Fig. 3 shows the chuck viewed in plan from the left in Fig. 2, and Fig. 4 shows a section of the left part in Fig. 2 on line IV—IV in Fig. 3. Fig. 5 is a lateral view, and Fig. 6 is a front view of the grinding fixture.

The chuck according to Fig. 2 is of known construction, and therefore it is not described or illustrated more particularly. The reference numeral 1 indicates the jaw casing, 2 the jaws and 3 the usual adjusting screw by which the jaws are adjusted.

According to the invention a ring 4 is fixed to the chuck. Reference numeral 5 denotes the central opening of ring 4 with two tracks or guides 6 which are parallel with one another and form guides for adjusting unit 7 consisting of two bushings 10, 11, the former bushing being located within the latter. The bushing 10 has a flange 12 which is part of adjusting unit 7, and the bushing 11 has a flange 13. The bushings are located in such a way that each flange contacts its individual side of the ring 4 around the centre of the disk. The bushing 10 is threaded at 14. On to the bushing 10 there is pushed a washer 15 which can be tightened against the flange 13 by means of a nut 17. By this device the adjusting unit 7 can be locked in different positions along the tracks 6.

The ring 4 is being fixed to the rear side of the chuck 1 by bolts 18. Part of the jaw casing of the chuck is cut away at the bottom to show how a threaded bolt is screwed into the jaw casing. Three such bolts might be necessary in this case. Further, it will be seen how a narrow portion 4a of the ring is inserted in a corresponding recess 1a of the jaw casing.

When the chuck is to be mounted in the lathe, the ring 4 is first fixed in a suitable manner in the lathe by inserting a centre pin into the hole 10a of the bushing 10, i. e. the centering hole. The ring 4 is locked up by means of fixing members 38 which are made to engage recesses 20. By means of bolts 40, members 38 are secured to the spindle disc 39.

The eccentricity is adjusted by means of gauge blocks which are placed between two measuring pins 21, 22, one of said pins being fixed to the ring 4, the other to the adjusting unit 7. The distance between the points can be selected in such a way that the eccentricity is equal to nought when a 10 mm. gauge block is used.

Fig. 1 shows an example of the eccentric pins which can be treated by being fixed in the chuck. As will be seen, this work piece consists of two pins $a$ and $b$, located eccentrically relatively to one another, one of the said pins being clamped in the chuck when the other is to be turned. After the turning the work piece is quite reversed, whereafter the pin just treated is clamped in the chuck and the other is turned. Another treatment is of course also possible.

The chuck according to Figs. 2–4 can also be used for clamping rotating tools.

Referring to Figs. 2a to 2d, the pin is denoted by the reference 42. The adjusting unit 7 is applied on a centre pin 44 which is inserted in the spindle 45 of the lathe. The centre line of the spindle is indicated by the reference 46. It is obvious that by moving the adjusting unit 7 in the ring 4 across the pin 44 the ring can be brought into different eccentric positions in relation to the centre line 46, and consequently the pin 42 can be positioned more or less eccentrically to said line. In the situation shown in Fig. 2a the eccentricity is $= b$ and is equal to the distance between the centre of the pin and centre of a hole 43 which has been drilled in the pin, after having been fixed in the chuck.

Thanks to this invention it is possible to locate the chuck, when fixed to the ring 4, exactly in the wanted position, in a very simple way especially by using Johansson's gauge blocks. When the ring 4 is located as shown in Fig. 2b it is concentric with the pin 44 and the disk 39 and the distance between the elements 21 and 22 is $= a$. When the ring 4 is located as in Figs. 2a and 2c the distance between the members 21, 22 are $a+b$.

The wanted eccentricity, for instance $b$, is exactly settled by the following operation, before fixing the ring 4 to the disk 39.

The nut 17 is loosened, and just those gauge blocks are inserted between the surfaces of the members 21 and 22 which give the wanted distance, and then the adjusting unit 7 is moved in the ring 4 until both elements contact the gauge blocks, and after that the adjusting unit 7 is fastened again in the ring 4 by tightening the nut. Finally the ring 4 and the chuck 1 are fixed to the disk 39 as described in the specification.

In the fixture for grinding pins shown in Figs. 5 and 6 the ring 4 with its inner parts, e. g. 6, 7, 17, is to be found. This ring is fixed to the machine spindle by means of screws 25, then the adjusting unit 7 is adjusted on the ring 4 in the desired eccentric position. The ring 4 has a console 26 and the console has a fixing bed 27, in the V-profiled recess 28 of which e. g. the axle journal 30 to be treated is placed and clamped. The clamping is effected by means of a screw 31 sitting in a cross piece 32 fixed on the bed.

According to the embodiment shown in Fig. 5 the work piece 30 is locked by means of the bed 27 and the screw 31 in a certain eccentric position in relation to the centre around which the console or support 26 is to be rotated. A cylindric pin 34 is inserted in the centre hole 10a of the adjusting unit 7. After that the ring 4 and thereby the console 26 and the work piece 30, in relation to the pin 34, are adjusted by means of gauge blocks 35, 36 to a position in which the work piece and the pin have the desired mutual eccentricity.

Having now described my invention, what I claim as new and desire to secure by Letters Patent is:

1. In a device of the character described, the combination of a chuck mounting ring comprising guide means forming part of and disposed inside the opening of said ring and transversely of the axis thereof, a measuring element on said ring, an adjusting unit movably disposed on said guide means, locking means operatively connected with said adjusting unit for locking the latter to the guide means at any selected point thereof, a second measuring element, the latter being fixed to said adjusting unit, said measuring elements being in opposed relation with respect to each other and permitting determination of the position of said ring relative to the centre of said adjusting unit.

2. The device claimed in claim 1, in which said adjusting unit comprises a pair of concentrically arranged flanged bushings, the flanges of said bushings embracing said guide means and being movable thereon, and in which said measuring elements form oppositely disposed projections.

3. The device claimed in claim 2, having secured to the ring thereof clamping means for a work piece, whereby said clamping means may be positioned on centre or eccentrically with respect to said ring.

NILS BERTIL FREDRIK HOLLANDER.

REFERENCES CITED

The following references are of record in the file of this patent:

UNITED STATES PATENTS

| Number | Name | Date |
|---|---|---|
| 436,459 | McClure | Sept. 16, 1890 |
| 1,056,476 | Wennerstrom | Mar. 18, 1913 |
| 1,256,462 | Frey et al. | Feb. 12, 1918 |
| 1,907,408 | Schimmel | May 2, 1933 |
| 2,357,062 | Stoll | Aug. 29, 1944 |